United States Patent
Freitas et al.

(10) Patent No.: US 10,152,388 B1
(45) Date of Patent: Dec. 11, 2018

(54) ACTIVE STREAM COUNTS FOR STORAGE APPLIANCES

(71) Applicant: EMC Corporation, Hopkinton, MA (US)

(72) Inventors: Ornat S. Freitas, Raleigh, NC (US); Xiaohong W. Wang, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 216 days.

(21) Appl. No.: 14/502,491

(22) Filed: Sep. 30, 2014

(51) Int. Cl.
*G06F 11/14* (2006.01)
*G06F 3/06* (2006.01)

(52) U.S. Cl.
CPC ........ *G06F 11/1453* (2013.01); *G06F 3/0601* (2013.01); *G06F 3/0604* (2013.01); *G06F 3/065* (2013.01); *G06F 3/067* (2013.01); *G06F 3/0643* (2013.01); *G06F 3/0683* (2013.01); *G06F 11/1446* (2013.01); *G06F 11/1458* (2013.01); *G06F 2003/0697* (2013.01)

(58) Field of Classification Search
CPC ...... G06F 3/0601; G06F 3/0604; G06F 3/061; G06F 3/0611; G06F 3/0613; G06F 3/0641; G06F 3/0643; G06F 3/065; G06F 3/0653; G06F 3/067; G06F 3/0683; G06F 2003/0697; G06F 11/1446; G06F 11/1448; G06F 11/1451; G06F 11/1453; G06F 11/1456; G06F 11/1458; G06F 11/1461; G06F 11/1464; G06F 11/1469; G06F 17/30067; G06F 17/3007; G06F 17/30073; G06F 17/30156; G06F 17/30194; G06F 17/30197; G06F 17/302; G06F 17/30212; G06F 17/30215
See application file for complete search history.

(56) References Cited

U.S. PATENT DOCUMENTS

| | | | | |
|---|---|---|---|---|
| 5,530,905 A * | 6/1996 | Nichols | ................... | H04L 29/00 709/203 |
| 6,349,350 B1 * | 2/2002 | Hathorn | .............. | G06F 11/1443 709/238 |
| 7,200,641 B1 * | 4/2007 | Throop | ............... | H04L 67/1097 709/217 |
| 7,240,150 B1 * | 7/2007 | Todd | ................. | G06F 17/30067 711/108 |
| 7,240,234 B2 * | 7/2007 | Morita | ................ | G06F 11/2046 710/36 |
| 7,320,032 B2 * | 1/2008 | Johnson | .................. | H04L 67/42 709/225 |
| 7,392,291 B2 * | 6/2008 | Jewett | .................... | G06F 3/0626 709/214 |
| 7,627,710 B1 * | 12/2009 | Todd | ..................... | G06F 3/0605 709/203 |

(Continued)

OTHER PUBLICATIONS

"EMC Data Domain Boost for Symantec NetBackup OpenStorage—Best Practices Planning", EMC Corporation, Feb. 2013.*

*Primary Examiner* — Vivek Srivastava
*Assistant Examiner* — William C McBeth
(74) *Attorney, Agent, or Firm* — Peter Jovanovic; Theodore A. Chen; Krishnendu Gupta

(57) ABSTRACT

A method system and process for managing connection stream is discussed. A count is incremented and/or decremented as connections are established. If the count equals a threshold, additional connections are rejected.

20 Claims, 4 Drawing Sheets

(56) References Cited

U.S. PATENT DOCUMENTS

| | | | | |
|---|---|---|---|---|
| 7,770,054 B2* | 8/2010 | Clark | G06F 11/0727 | 710/52 |
| 8,307,004 B2* | 11/2012 | Weiss | G06F 11/1458 | 707/791 |
| 8,593,918 B1* | 11/2013 | Lecrone | G06F 11/14 | 369/30.01 |
| 8,683,099 B1* | 3/2014 | Mandic | G06F 9/505 | 710/39 |
| 8,924,355 B1* | 12/2014 | Kundzich | G06F 11/1458 | 707/647 |
| 2002/0156887 A1* | 10/2002 | Hashimoto | G06F 3/067 | 709/224 |
| 2002/0178264 A1* | 11/2002 | Benda | G06F 9/5072 | 709/227 |
| 2004/0078520 A1* | 4/2004 | Don | G06F 3/0601 | 711/114 |
| 2008/0086658 A1* | 4/2008 | Takahasi | G06F 11/1456 | 714/6.12 |
| 2009/0089791 A1* | 4/2009 | Benhase | G06F 9/5016 | 718/104 |
| 2009/0222621 A1* | 9/2009 | Ash | G06F 3/0613 | 711/112 |
| 2009/0248917 A1* | 10/2009 | Kalos | G06F 3/061 | 710/39 |
| 2009/0320029 A1* | 12/2009 | Kottomtharayil | G06F 9/505 | 718/102 |
| 2010/0094999 A1* | 4/2010 | Rama | G06F 9/4843 | 709/225 |
| 2010/0225951 A1* | 9/2010 | Koshigaya | G06F 3/1203 | 358/1.14 |
| 2011/0125717 A1* | 5/2011 | Manson | G06F 11/1458 | 707/679 |
| 2012/0102088 A1* | 4/2012 | Bindal | G06F 11/1461 | 709/203 |
| 2013/0013744 A1* | 1/2013 | Campbell | H04L 67/06 | 709/219 |
| 2013/0332505 A1* | 12/2013 | Karandikar | G06F 11/1461 | 709/202 |
| 2014/0052694 A1* | 2/2014 | Dasari | G06F 11/1461 | 707/654 |
| 2014/0068212 A1* | 3/2014 | Lin | G06F 11/1461 | 711/162 |
| 2014/0092757 A1* | 4/2014 | Xu | G06F 11/349 | 370/252 |
| 2014/0304239 A1* | 10/2014 | Lewis | G06F 3/0608 | 707/692 |
| 2015/0089135 A1* | 3/2015 | Iizawa | G06F 3/0685 | 711/114 |

* cited by examiner

ACTIVE STREAM COUNTS FOR STORAGE APPLIANCES

FIELD OF THE INVENTION

This invention relates generally to backup and recovery systems, and more particularly to systems and methods for managing data streams utilized during backup and recovery processes.

BACKGROUND OF THE INVENTION

Backup operations commonly involve transmitting data from a primary storage to a backup storage. This transmission may occur, for example, over a network. Data transmission may be limited, however, dues to resource available on the network, at the primary storage, at the backup storage, or some combination thereof.

There is therefore a need for an improved system, method, and process for managing data transmissions from a primary storage to a backup storage.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
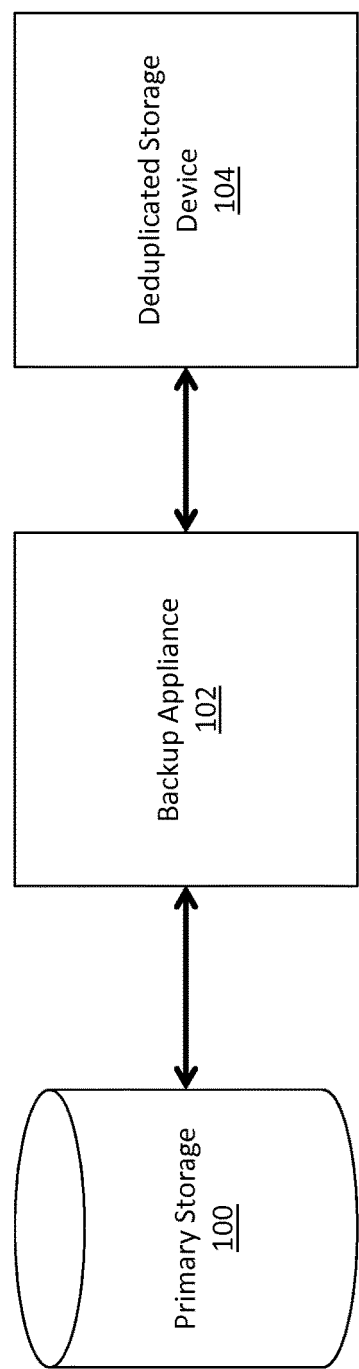
FIG. 1 depicts a data protection system consistent with an embodiment of the present disclosure.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general-purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

The present disclosure discusses systems and methods for managing IO streams between a backup appliance and a deduplicated storage device. A backup appliance may be software or a hardware device for managing backup and recovery operations between primary storage and backup storage. These backup and recovery operations may include streaming input/outputs ("IO"), which may comprise read and/or write operations, from the appliance to the storage. In an embodiment, resource constraints may limit the number of active communication streams between the appliance and the backup storage. For example, the backup storage may only have sufficient hardware resources to efficiently manage 90 active streams. As a result, the system may only be able to efficiently manage 90 concurrent backup/recoveries. The system and processes discussed herein help manage these streams.

Traditionally, the number of open files determines the number of active streams. For example, if there are five open files on a deduplicated storage device, the system may determine that there are five active streams. The number of open files may not, however, be an accurate representation of active streams. For example, a backup appliance may open a file for a backup, but not transmit any data for that backup for an extended period of time. There is therefore no active stream during that time, and counting the file would result in an incorrect active stream count. The present disclosure prevents this issue.

FIG. 1 depicts a backup and recovery system consistent with an embodiment of the present disclosure. The system may comprise primary storage 100, which may comprise a physical storage device. For example, primary storage 100 may be a disk or solid-state drive residing in a personal computer. Additionally or alternatively, primary storage 100 may comprise a plurality of physical drives in a production server. Primary storage may contain data that users or an administrator wishes to backup and/or recover.

The system shown in FIG. 1 also comprises backup appliance 102. Backup appliance 102 may comprise a stand-alone, general-purpose machine containing hardware and software for managing backup and recovery processes. Additionally or alternatively, the appliance may be a software module residing inside primary storage 100 or deduplicated backup storage 104. Backup appliance 102 may be in communication with both primary storage 100, and deduplicated backup storage 104. This communication could be, for example, a network connection.

The backup and recovery system may further comprise deduplicated storage device 104. Deduplicated storage device 104 may be a general or specific purpose machine designed to conserve storage resources. In some embodiments, deduplicated storage device 104 may store only a single instance of a chunk of data. One example of a deduplicated storage device is a DataDomain® system provided by EMC® Corporation.

Figure 2:
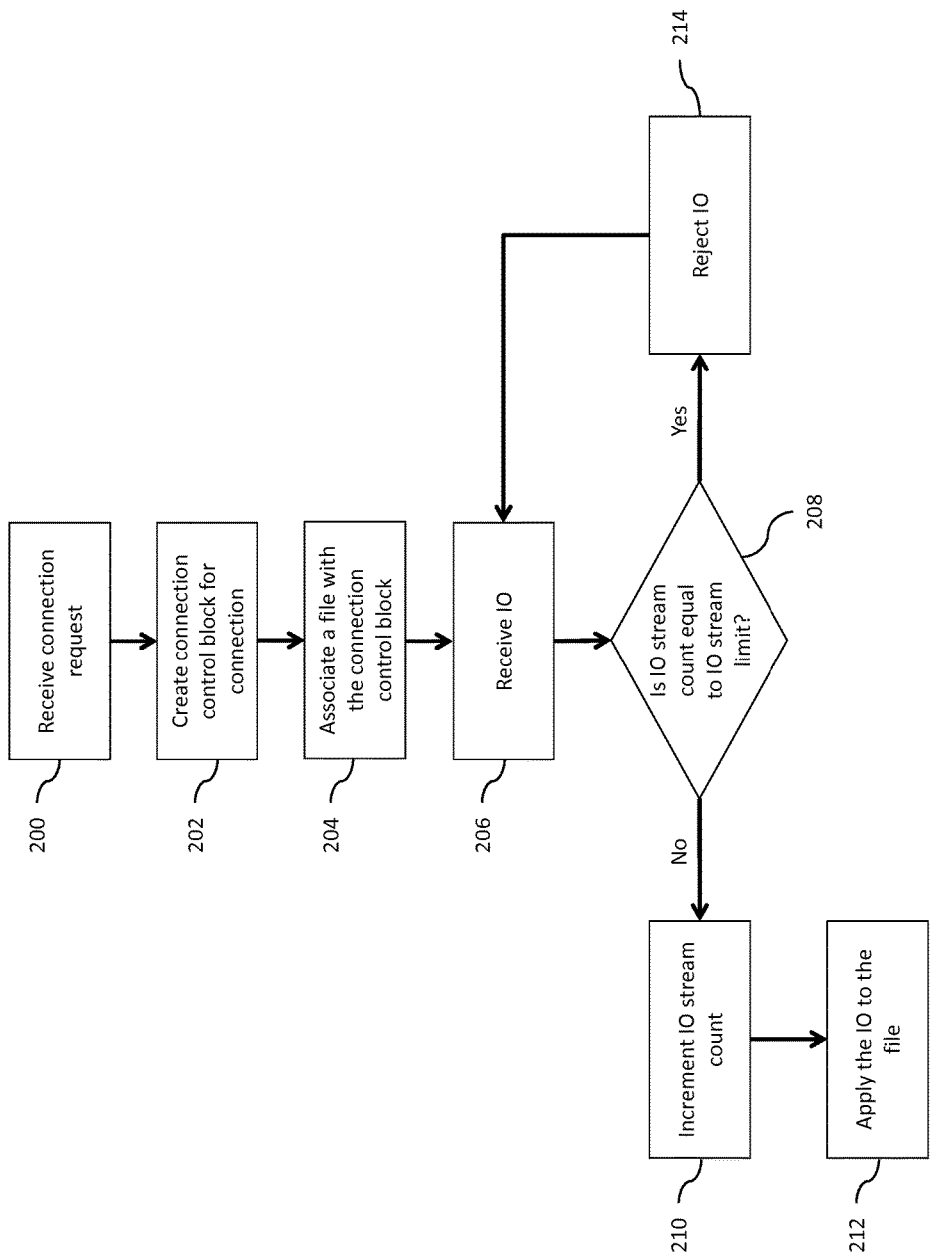
FIG. 2 depicts a process for managing available data streams consistent with an embodiment of the present disclosure.

Turning now to FIG. 2, a process for managing multiple backup and/or recovery streams is discussed. In some embodiments, the process may comprise hardware and/or software modules operating on backup appliance 102 and/or deduplicated storage device 104.

At block 200, a plurality of connection requests may be received from a backup appliance at a deduplicated storage device. A connection request could be, for example, a request to initialize a network connection and/or a backup/recovery operation between the backup appliance and the deduplicated storage device. In an embodiment, the connection may utilize an over-the-wire protocol to minimize data transfer between the backup appliance and the deduplicated storage device, such as the DD Boost™ protocol.

At 202, a connection control block ("CB") may be created and initialized at the backup appliance, the deduplicated storage device, or both. The connection control block may comprise a logical module residing in memory or on a computer readable storage medium. In some embodiments, the CB may manage the network connection and data streams between the backup appliance and the deduplicated storage device. For example, the CB may include a variable or other identifier for a data stream. If the CB includes an active data stream, the variable may be set to true or assigned an identifier for that stream. If the CB does not have an active stream, the variable may be set to false or void. In some embodiments, the CB may also identify a stream type. For example, the CB may comprise a variable differentiating between a read stream and a write stream. This may be helpful when different stream types have different limits, as discussed below.

At 204, a file may be associated with the connection block. If the CB is managing a read stream, such as during a recovery operation, the file to be read from may be located in the deduplicated storage device and associated with the CB. If the CB is managing a write stream, such as during a backup operation, a new file may be created on the deduplicated storage device and associated with the CB. Alternatively, an existing file for the backup operation may be identified and associated with the CB.

At 206, an IO may be received over the connection. The IO may be either an read request or a write request. In some embodiments, the IO is generated by the backup appliance and received by the deduplicated storage device. This IO may be the start of a backup and/or recovery process.

At 208, a check is made to determine whether an IO stream count is equal to an IO stream limit. In some embodiments, the IO stream count and IO stream limit may be stored in a data structure residing in memory or on a non-transitory computer readable storage medium. An IO stream limit may be the number of active data streams a deduplicated storage device can process. This number may be defined by a user or administrator, or may be dynamically determined by resources available to the deduplicated storage device. For example, the storage device may only have sufficient resources to process 90 data streams without taking an unacceptable performance hit. The IO stream limit may therefore be set to 90. In some embodiments, the IO stream limit may be divided into two stream limits. One stream limit may be a write stream limit, and the other may be a read stream limit. These two stream limits may be assigned different numbers.

The IO stream count may comprise the number of active IO streams. For example, the IO stream count may be set to three if there are only three backup/recovery operations occurring. This allows the system to know exactly how many data streams are being consumed.

The check at 208 is made to determine whether the IO stream count is equal to the IO stream limit. In other words, the check determines whether there is an available IO stream to assign to the received IO task. If the count is less then the limit, there may be a stream available and the process continues to block 210. If the count is equal to or greater than the limit, there is not a stream available and the process continues to block 214.

If the count is less than the limit, the process may continue to block 210. At block 210, the IO stream count may be incremented by one, thereby indicating that a new stream is active and not available to other processes. If the IO stream count and/or limit is divided between a read count and a write count, the appropriate count for the given operation may be incremented. For example, the write count may be incremented for a write operation and the read count may be incremented for a read operation.

Finally, at block 212 the IO may be applied to the file. For example, if the IO is a read request, data may be read from the file and returned to the requestor. Similarly, if the IO is a write request, data may be written to the file.

Returning now to check 208, if the IO stream count is equal to or greater than the IO stream limit, the process may continue to block 214. At 214, the IO may be rejected because there are no streams available to process the request. This rejection could be communicated back to the CB and/or the backup appliance, which may hold the IO in abeyance for a period of time. After this time, the process may return to block 206 and the IO may be received again. Another check is made at 208 to determine whether there is a stream available. If so, the IO may be processed as discussed above. If not, the IO may be held in abeyance again until an IO stream is available.

In some embodiments, block 208 may also check to see if the IO is a write received via a write stream, and whether the write stream was closed due to a connection error. If so, the process may continue to block 210, even if the write IO stream count is equal to or exceeds the write IO stream limit. The associated performance impact from exceeding the limit may be acceptable because the write stream may be in the middle of a backup. In such an embodiment, it may be preferable to finish the backup rather than waiting for another write stream to become available.

In an embodiment, an IO may increment both a write stream count and a read stream count. For example, the IO may a write IO to a deduplicated storage device. Since the storage device is deduplicated, meaning the amount of duplicate data on the device is minimized, the data or data reference embodied in the write request may be read from an existing location and written to the write IO's destination. In such an embodiment may include a check and increment for both a read stream counter and a write stream counter since one file on the deduplicated storage must be read from, and another file must be written to.

Figure 3:
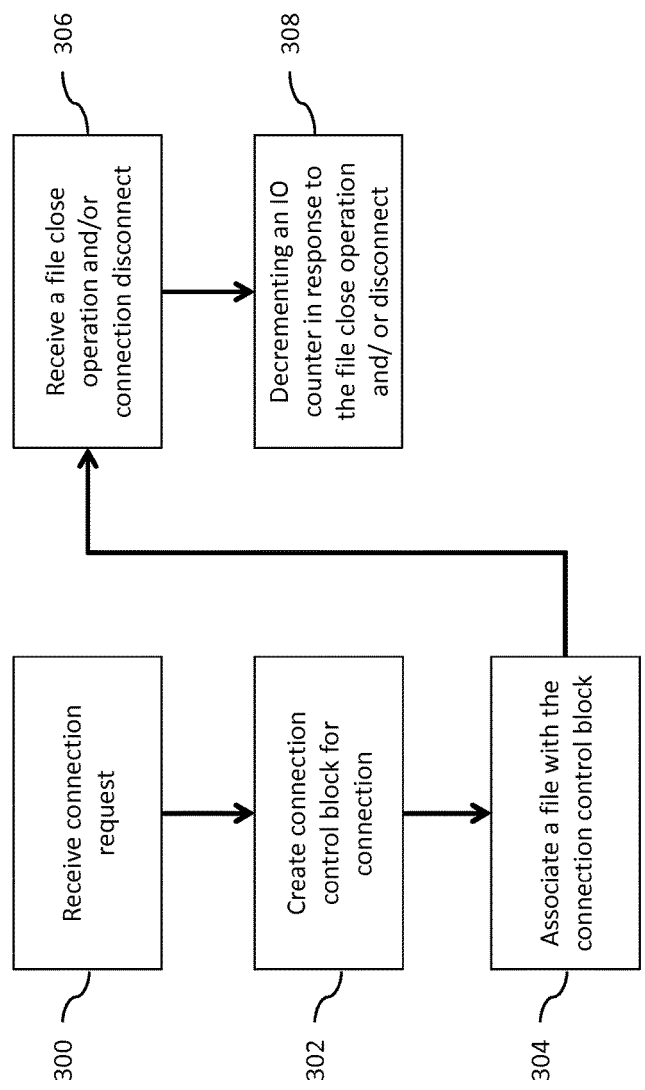
FIG. 3 depicts a process for decrementing an IO stream count consistent with an embodiment of the present disclosure.

With reference now to FIG. 3, a process for releasing streams is discussed. At block 300, a connection request may be received, at 302 a connection block can be created, and at 304 a file may be associated with the control block. In an embodiment, these blocks may be substantially similar to blocks 200-04, discussed above. Additionally, IO may be received and processed over a connection associated with the request as discussed in reference to FIG. 2.

At block 306, a file close operation may be received or the connection may be severed. For example, the backup process may be complete and the backup appliance may indicate that the file should be closed and stored to disk. Additionally or alternatively, a restore operation may be complete and the connection may be closed.

Finally, at block 308 the IO counter may be decremented in response to the file close operation or connection disconnect. The counter may be decremented because the associated stream is not longer in use and should be made available to other operations. For example, this decrement may occur between blocks 214 and 206 in FIG. 2. When the IO is received at block 208 the next time, the IO count may not be equal to the IO limit because the count was recently decremented. The stream resources may therefore be utilized by the CB and the IO may be processed appropriately.

Figure 4:
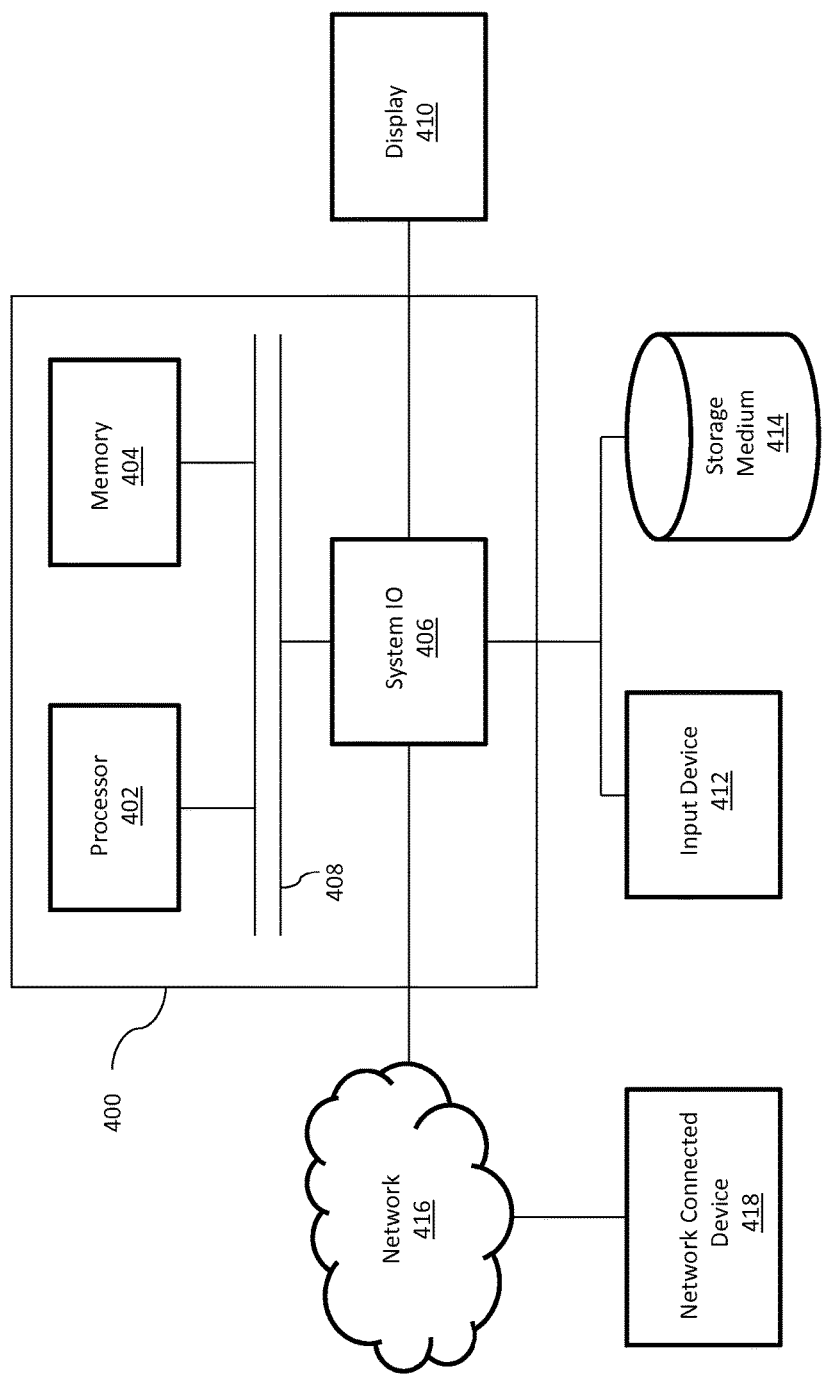
FIG. 4 depicts a general-purpose computer system consistent with an embodiment of the present disclosure.

FIG. 4 depicts a computer system which may be used to implement different embodiments discussed herein. General-purpose computer 400 may include processor 402, memory 404, and system IO controller 406, all of which may be in communication over system bus 408. In an embodiment, processor 402 may be a central processing unit ("CPU") or accelerated processing unit ("APU"). Some embodiments may comprise multiple processors, or a processor with multiple cores. Processor 402 and memory 404 may together execute a computer process, such as the processes described herein.

System IO controller 406 may be in communication with display 410, input device 412, non-transitory computer readable storage medium 414, and/or network 416. Display 410 may be any computer display, such as a monitor, a smart phone screen, or wearable electronics and/or it may be an input device such as a touch screen. Input device 412 may be a keyboard, mouse, track-pad, camera, microphone, or the like, and storage medium 414 may comprise a hard drive, flash drive, solid state drive, magnetic tape, magnetic disk, optical disk, or any other computer readable and/or writable medium. Storage device 414 may also reside inside general purpose computer 400, rather than outside as shown in FIG. 1.

Network 416 may be any computer network, such as a local area network ("LAN"), wide area network ("WAN") such as the internet, a corporate intranet, a metropolitan area network ("MAN"), a storage area network ("SAN"), a cellular network, a personal area network (PAN), or any combination thereof. Further, network 416 may be either wired or wireless or any combination thereof, and may provide input to or receive output from IO controller 406. In an embodiment, network 416 may be in communication with one or more network connected devices 418, such as another general purpose computer, smart phone, PDA, storage device, tablet computer, or any other device capable of connecting to a network.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for managing backup communication streams, the method comprising:
   receiving a plurality of connection requests at a deduplicated backup storage device from a backup appliance;
   creating a connection control block on the deduplicated backup storage device for each of the connection requests from the backup appliance, wherein each connection control block manages a connection between the deduplicated backup storage device and the backup appliance;
   receiving a first IO comprising a first data backup operation at the deduplicated backup storage device for a first connection from the backup appliance;
   determining whether an IO stream count equals an IO stream limit;
   incrementing the IO stream count and processing the first IO on the deduplicated backup storage device when the IO stream count is not equal to the IO stream limit;
   receiving a second IO comprising a second data backup operation at the deduplicated backup storage device for a second connection from the backup appliance;
   determining whether the IO stream count is equal to the IO stream limit;
   determining by a connection control block for the second connection whether the second connection is closed due to a connection error; and
   processing, by the connection control block for the second connection, the second IO when the IO stream count is equal to the IO stream limit and the second connection is closed due to a connection error while a backup operation is in progress, wherein the connection error is communicated to the connection control block for the second connection, and wherein the connection control block for the second connection does not hold the second IO in abeyance.

2. The method of claim 1, wherein the first IO is a write IO, the IO stream count is a write stream count, and the IO stream limit is a write stream limit.

3. The method of claim 2, further comprising creating a file on the deduplicated backup storage device for each of the connection requests in response to the connection requests.

4. The method of claim 3, further comprising associating the file with a connection control block for the first connection.

5. The method of claim 4, further comprising writing the first IO to the file.

6. The method of claim 1, wherein the first IO is a read IO, the IO stream count is a read stream count, and the IO stream limit is a read stream limit.

7. The method of claim 1, further comprising associating a file on the deduplicated backup storage device with a connection control block for the first connection.

8. The method of claim 7, further comprising applying the first IO to the file.

9. The method of claim 8, further comprising receiving a file close operation from the backup appliance.

10. The method of claim 9, further comprising decrementing the IO stream count in response to the file close operation.

11. The method of claim 1, further comprising receiving an end of IO indication from the backup appliance.

12. The method of claim 11, further comprising decrementing the IO stream count in response to the end of IO indication.

13. A system for managing backup communication streams, the system comprising:
    a backup appliance comprising a processor, computer readable medium, and backup software; and
    a deduplicated storage device comprising a computer readable storage medium and a processor, the processor executing instructions comprising:
    receiving a plurality of connection requests at the deduplicated backup storage device from the backup appliance;
    creating a connection control block on the deduplicated backup storage device for each of the connection requests from the backup appliance, wherein each connection control block manages a connection between the deduplicated backup storage device and the backup appliance;
    receiving a first IO comprising a first data backup operation at the deduplicated backup storage device for a first connection from the backup appliance;
    determining whether an IO stream count equals an IO stream limit;
    incrementing the IO stream count and processing the first IO on the deduplicated backup storage device when the IO stream count is not equal to the IO stream limit;
    receiving a second IO comprising a second data backup operation at the deduplicated backup storage device for a second connection from the backup appliance;
    determining whether the IO stream count is equal to the IO stream limit;
    determining by a connection control block for the second connection whether the second connection is closed due to a connection error; and
    processing, by the connection control block for the second connection, the second IO when the IO stream count is equal to the IO stream limit and the second connection is closed due to a connection error while a backup operation is in progress, wherein the connection error is communicated to the connection control block for the second connection, and wherein the connection control block for the second connection does not hold the second IO in abeyance.

14. The system of claim 13, wherein the first IO is a write IO, the IO stream count is a write stream count, and the IO stream limit is a write stream limit.

15. The system of claim 14, further comprising creating a file on the deduplicated backup storage device for each of the connection requests in response to the connection requests.

16. The system of claim 15, further comprising associating the file with a connection control block for the first connection.

17. The system of claim 16, further comprising writing the first IO to the file.

18. A computer program product comprising a non-transitory computer readable medium having instructions encoded therein for managing backup communication streams, the instructions comprising:
    receiving a plurality of connection requests at a deduplicated backup storage device from a backup appliance;
    creating a connection control block on the deduplicated backup storage device for each of the connection requests from the backup appliance, wherein each connection control block manages a connection between the deduplicated backup storage device and the backup appliance;
    receiving a first IO comprising a first data backup operation at the deduplicated backup storage device for a first connection from the backup appliance;
    determining whether an IO stream count equals an IO stream limit;
    incrementing the IO stream count and processing the first IO on the deduplicated backup storage device when the IO stream count is not equal to the IO stream limit;
    receiving a second IO comprising a second data backup operation at the deduplicated backup storage device for a second connection from the backup appliance;
    determining whether the IO stream count is equal to the IO stream limit;
    determining by a connection control block for the second connection whether the second connection is closed due to a connection error; and
    processing, by the connection control block for the second connection, the second IO when the IO stream count is equal to the IO stream limit and the second connection is closed due to a connection error while a backup operation is in progress, wherein the connection error is communicated to the connection control block for the second connection, and wherein the connection control block for the second connection does not hold the second IO in abeyance.

19. The computer program product of claim 18, wherein the first IO is a write IO, the IO stream count is a write stream count, and the IO stream limit is a write stream limit.

20. The computer program product of claim 18, wherein the first IO is a read IO, the IO stream count is a read stream count, and the IO stream limit is a read stream limit.

* * * * *